UNITED STATES PATENT OFFICE.

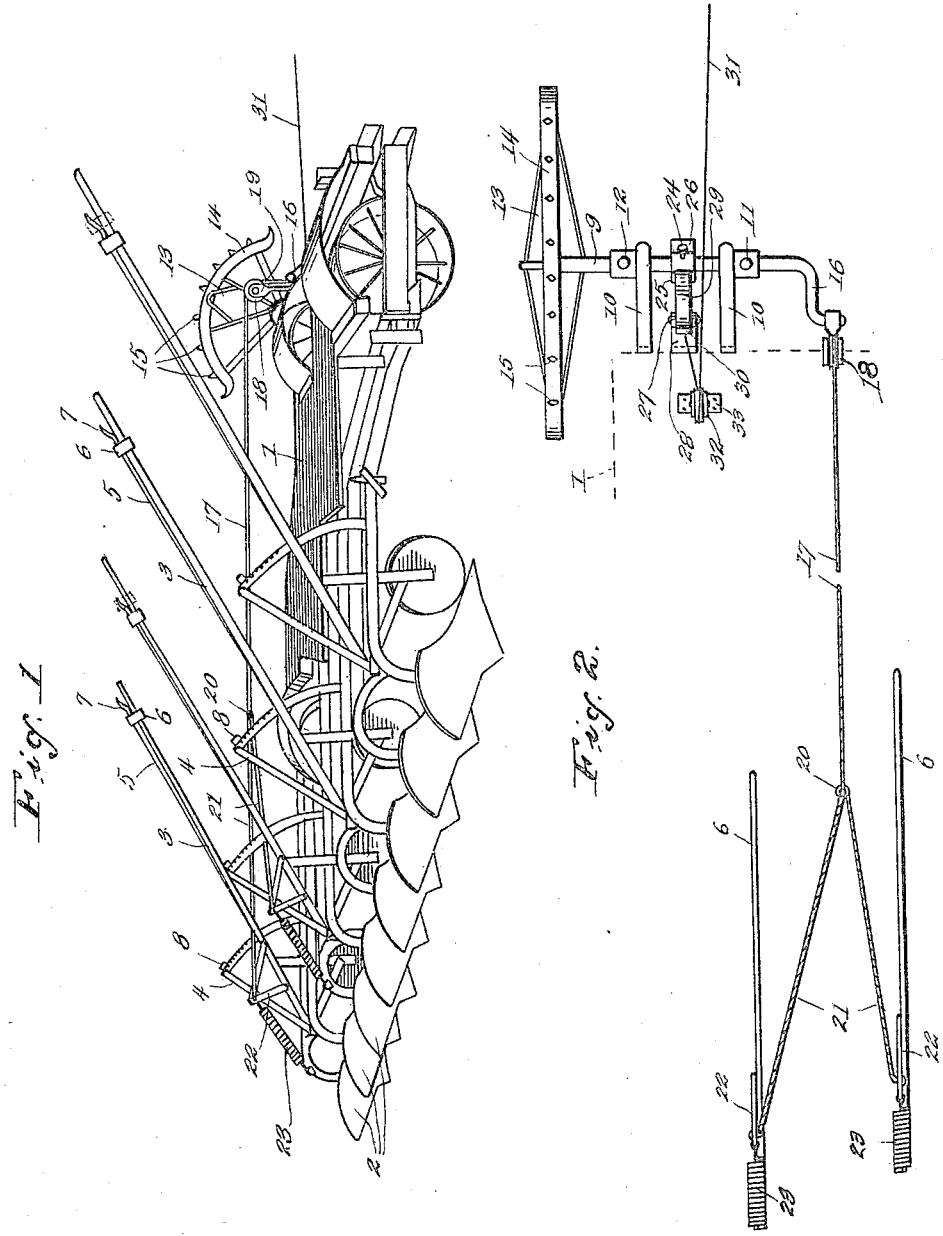

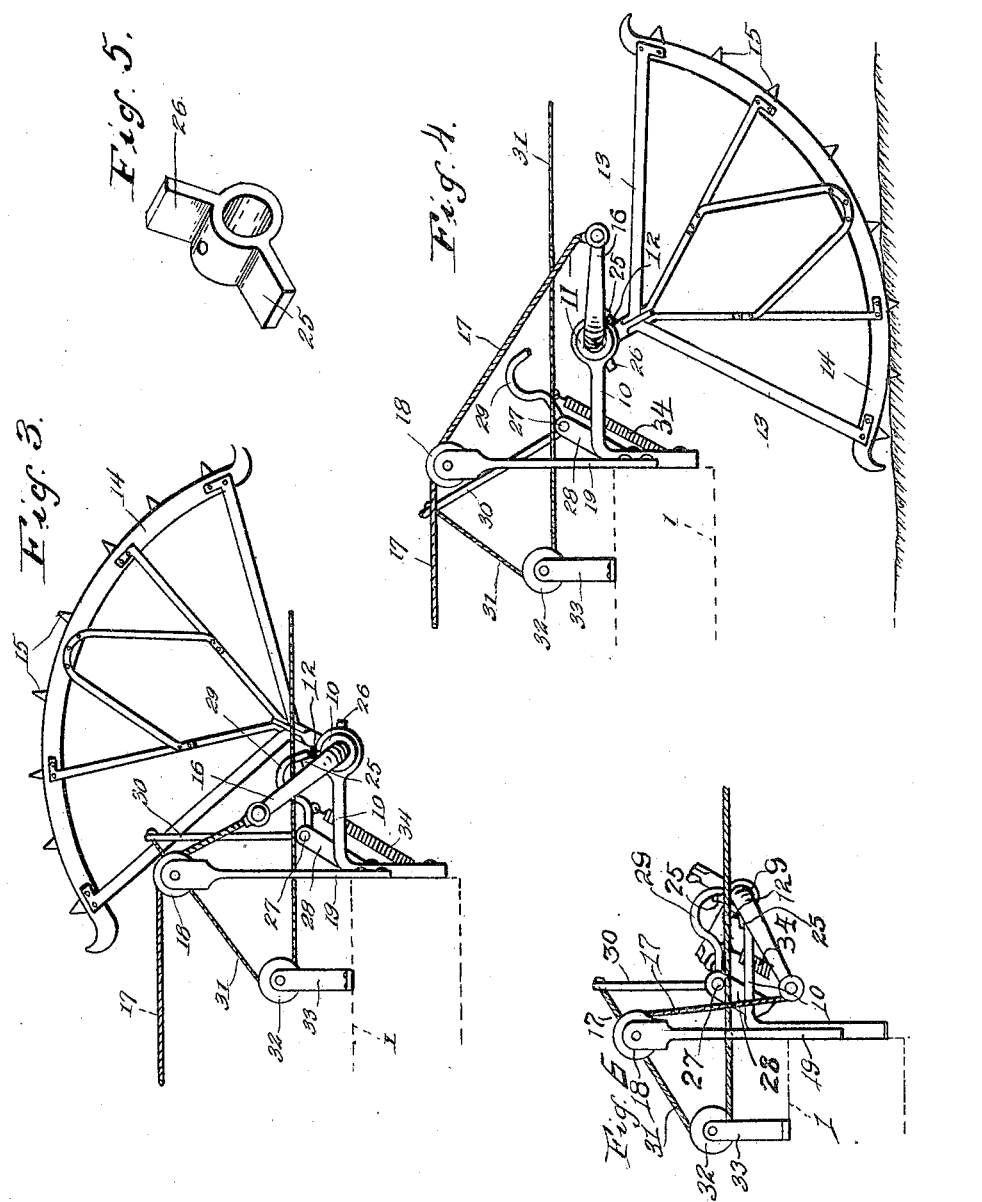

EDWARD WILLIAM WITHNELL, OF JUD, NORTH DAKOTA.

PLOW LIFTING OR ELEVATING MECHANISM.

1,106,766.  Specification of Letters Patent.  Patented Aug. 11, 1914.

Application filed November 7, 1912. Serial No. 730,026.

*To all whom it may concern:*

Be it known that I, EDWARD WILLIAM WITHNELL, a citizen of the United States, residing at Jud, in the county of Lamoure and State of North Dakota, have invented new and useful Improvements in Plow Lifting or Elevating Mechanism, of which the following is a specification.

My invention relates to means for elevating or lifting plows or other agricultural implements whereby the same may be maintained elevated or out of contact with the ground at desired times.

One object of the invention is to provide mechanism which is operable through the movement of a tractor operated by contact with the ground.

Another object of the invention is to provide spring means in connection with the tractor and also cable means to assist in the elevation of the plows upon the tractor moving out of contact with the ground.

Still another object of the invention is to provide improved means whereby the tractor may be lowered through the medium of mechanism operated from a traction engine or other propelling means for the plows.

Further objects of the invention, mostly minor in nature, will appear hereinafter from the description of the preferred embodiment of my invention as shown in drawings accompanying this application.

In said drawings:—Figure 1 is a perspective view of a gang plow showing my improved mechanism in place thereon; Fig. 2 is a plan view of the mechanism embodying my invention; Fig. 3 is a side elevation of the tractor and coöperating means showing the same attached to the platform of a plow, and the tractor in the position assumed while the plows are in soil-penetrating position; Fig. 4 is a side elevation of the same parts as Fig. 3, but showing the tractor lowered and in engagement with the ground. Fig. 5 is a perspective view of the lug device or keeper device employed in connection with the tractor locking latch, and Fig. 6 is a fractional side elevation of the tractor and coöperating means showing the same attached to the platform of a plow, and a tractor in another position assumed while the plows are out of engagement with the soil.

Referring to the drawings, like reference characters designate like parts throughout the various views.

Referring specifically to the drawings, 1 designates the platform of a gang plow of any preferred form, which gang plow is adapted to be propelled by means of a traction engine or otherwise, as usual. The plow members of the gang plow are designated 2 and may be operated singly or in multiple from the usual operating levers which are designated 3. Said levers, as will be obvious, are those which regulate the depth of penetration of the plows into the soil.

Numeral 4 designates the usual toothed segments adapted to be engaged by usual plunger devices 5 attached to the levers 3.

In the application of my invention to plows of this type, it is necessary to provide means to maintain the plunger out of engagement with the segment so that the plows may be swung or moved vertically through the operation of the parts later to be described. Such means may consist of a collar 6 on the lever 3 adapted to slide over the plunger-actuating handle or lever 7, and thereby maintain the plunger out of engagement with the segment. See Figs. 1 and 7. Suitable stops or lugs such as 8, are preferably provided on the segments 4 to limit the upward movement of the levers 3, and accordingly regulate the depth of penetration of the plows into the soil.

In the drawings, the mechanism of my invention is shown adapted to raise a portion of the plows, by way of illustration, it being clear of course that further mechanism is necessary to raise the remainder of the plows.

Referring now to the mechanism embodying my invention, 9 designates a rotatable shaft which is supported in any suitable manner from the platform 1 as by means of brackets 10. Lateral sliding movement of the shaft 9 in the brackets 10 is prohibited by the employment of suitable collars 11 which are clamped in place by the set screws 12 passing therethrough and binding against the shaft 9. The shaft 9 at one end, has rigidly attached thereto in any suitable manner, any preferred form of tractor, the one shown being segmental and designated 13, and its rim being designated 14 and provided with ground engaging teeth 15. Said shaft 9 at the end thereof opposite to the tractor, is bent or otherwise provided with a crank 16, to which is attached in any suitable manner a flexible member such as a cable 17. Said cable passes over a guide or idler pulley 18 supported in a bracket 19 connected to and rising from the platform 1. Said cable 17 extends from the front of the plow toward the rear thereof and may be directly coupled or connected so as to operate the plow, but is preferably connected as at 20 to a plurality of shorter cables 21. Said cables 21 are connected so as to actuate the plow members 2. On the levers 3 is provided any suitable form of bracket means 22 to which the cables 21 are directly connected. To the brackets 22 are secured exceedingly heavy and strong coil springs 23, which are also connected to suitable parts of the gang plow so that the same will at all times absorb the shocks received during the operation.

On the shaft 9, preferably midway thereof, is fastened as by means of a set screw 24, a latch keeper member provided with the lugs 25 and 26, the latter being disposed at right angles to each other. A latch member of suitable design is located in operative relation with the lugs 25 and 26 and as shown, is pivoted at 27 to a bracket 28 in turn fastened to the platform 1. Said latch member is provided with a hook end 29 to engage the lugs 25 and 26, and with an angle arm 30 to which is fastened a latch-operating cord or cable 31 which passes over a pulley 32 mounted in a bracket 33 fastened to the platform 1. The cord 31 is passed or fastened at any suitable point, and in use is preferably of such length as to extend to the traction engine usually propelling the gang plow, so that the cable 31 may be actuated from the traction engine and accordingly operate the latch 29 to permit the actuation of the tractor 13. A return spring 34 is provided for the latch and is attached thereto, and to another suitable part such as the platform 1.

The operation of the device is as follows: When the plows are in engagement with the soil, the tractor is in the position shown in Fig. 3, and the latch is in engagement with the lug 25 of the keeper member. When it is desired to raise the plows out of contact with the ground, the cord 31 is actuated, which will tilt or shift the latch so that the hook 29 thereof will be moved out of the path of the lug 25. Thereupon the tractor falls into engagement with the ground as shown in Fig. 4. It is to be noted that by means of the construction employed, and specifically of the location of the crank arm 16, that while the plows are in engagement with the ground, there is sufficient slack in the cable 17 to permit the tractor to freely fall to engage the ground. When the tractor engages the ground, the teeth 15 thereof penetrate the soil, and as the plow is moving forward or being propelled, said tractor is turned or rotated, and accordingly the shaft 9 is turned or rotated. When the tractor has been turned as described, and is out of engagement with the ground, the cable 17 will draw the tractor or cause the same to move upwardly a slight extent so that the lug 26 will engage against the hook 29 of the latch, the cord 31 having previously been released. By movement of the shaft it will be noted that the cable 17 is pulled through the medium of the crank arm 16, so that the plow members 2 are raised. When it is desired to again lower the plow members 2, the cord 31 is actuated so that the hook 29 of the latch disengages the lug 26. The tractor thereby being freed, the cable 17 will draw the tractor to position, where the lug 25 engages the hook 29 of the latch. It is to be noted that the cable 17 pulls the shaft 9 and tractor, and accordingly lug 26 against the hook 29 of the lever, so that the tractor will be securely locked or latched by engagement with the hook 29.

As merely the preferred embodiment of the invention has been shown, changes in the details of construction may be made without departing from the spirit and scope of the appended claims.

Having thus described my said invention, what I claim as new and desire to secure by Letters Patent is:—

1. In combination with a soil treating implement, a soil treating member thereon, a rotatable shaft, means on said shaft to engage the ground to rotate said shaft, a crank arm on said shaft, and flexible means connecting said crank arm and soil treating member to raise the latter through the rotation of the shaft.

2. In combination with a soil treating implement, a soil treating member thereon, a rotatable shaft, a tractor on said shaft to engage the ground, a crank arm on said shaft, a cable connecting said crank arm and said soil treating member to raise the latter through the rotation of the shaft, and a shock absorbing spring engaged upon said implement and said member.

3. In combination with a soil treating implement, a soil treating member mounted thereon, a wheel-like tractor rotatably mounted on said implement, means connecting said tractor and said member to raise the member through rotation of the tractor, and means coöperating with said raising means for simultaneously holding said tractor and said implement out of engagement with the ground and for holding said tractor out of engagement with the ground when said implement is in engagement with the ground.

4. In combination with a soil treating implement, a soil treating member mounted thereon, a shaft, a crank on said shaft, means connecting said crank and said member to operate the member through movement of the shaft, a wheel-like tractor rigidly mounted on said shaft to engage the ground, angular disposed stop means on said shaft, resiliently controlled means for engagement with said stop means to lock said shaft in position for simultaneously holding the tractor and implement out of engagement with the ground and for holding said tractor out of engagement with the ground when said implement is in engagement with the ground, and means for actuating said last mentioned means.

5. In combination with a soil treating implement, a soil treating member thereon, a shaft, means connecting said shaft and member to operate the member through movement of the shaft, a wheel-like tractor on said shaft to engage the ground, means to lock said shaft in various positions maintaining the tractor out of engagement with the ground, said means consisting of a plurality of latch-engaging members on said shaft, and a resiliently controlled latch on the implement.

6. In combination with a soil treating implement, a soil treating member thereon, a shaft, means connecting said shaft and member to operate the member through movement of the shaft, a tractor on said shaft to engage the ground, and means to lock said shaft in position maintaining the tractor out of engagement with the ground, said means consisting of lugs on the sides of the shaft and a spring-controlled latch on the implement in operative relation to said lugs.

7. In combination with a soil treating implement, a soil treating member thereon, an operating lever for said member, bracket means on said lever, a spring connected to said bracket means and another part, a cable connected to said bracket means, a rotatable shaft, bracket means supporting said shaft, a crank on said shaft, said cable connected to said crank, a tractor on said shaft to rotate the same through engagement with the ground, angularly disposed lugs on said shaft, a spring-controlled latch on said implement in operative relation to said lugs, and means to actuate said latch.

EDWARD WILLIAM WITHNELL.

Witnesses:
C. W. BURGES,
MANUEL F. BLANCO.

---

Copies of this patent may be obtained for five cents each, by addressing the "Commissioner of Patents, Washington, D. C."